(12) United States Patent
Choi et al.

(10) Patent No.: US 11,731,203 B2
(45) Date of Patent: Aug. 22, 2023

(54) INSERT AND CUTTING TOOL ASSEMBLY COMPRISING SAME

(71) Applicant: TaeguTec Ltd., Daegu (KR)

(72) Inventors: Chang Hee Choi, Daegu (KR); Chang Won Jeong, Daegu (KR)

(73) Assignee: TaeguTec Ltd., Daegu (KR)

( * ) Notice: Subject to any disclaimer, the term of this patent is extended or adjusted under 35 U.S.C. 154(b) by 181 days.

(21) Appl. No.: 16/981,817

(22) PCT Filed: Mar. 26, 2019

(86) PCT No.: PCT/KR2019/003501
§ 371 (c)(1),
(2) Date: Sep. 17, 2020

(87) PCT Pub. No.: WO2019/190165
PCT Pub. Date: Oct. 3, 2019

(65) Prior Publication Data
US 2021/0114118 A1  Apr. 22, 2021

(30) Foreign Application Priority Data
Mar. 28, 2018 (KR) .................. 10-2018-0036180

(51) Int. Cl.
*B23B 27/16* (2006.01)
(52) U.S. Cl.
CPC ...... *B23B 27/1644* (2013.01); *B23B 2200/04* (2013.01); *B23B 2200/163* (2013.01);
(Continued)

(58) Field of Classification Search
CPC .............. B23B 2265/32; B23B 27/145; B23B 27/1644; B23B 2200/04;
(Continued)

(56) References Cited

U.S. PATENT DOCUMENTS 5,071,291 A * 12/1991 Kaminski ............... B23C 5/202
407/30
6,217,263 B1   4/2001 Wiman et al.
(Continued)

FOREIGN PATENT DOCUMENTS

| JP | 2000-153402 | 6/2000 |
|----|-------------|--------|
| JP | 2003340614  | 12/2003 |

(Continued)

OTHER PUBLICATIONS

International Search Report dated Jul. 3, 2019, issued in counterpart International (PCT) Application (No. PCT/KR2019/003501).
(Continued)

*Primary Examiner* — Nicole N Ramos
(74) *Attorney, Agent, or Firm* — Womble Bond Dickinson (US) LLP

(57) ABSTRACT

A cutting insert and a cutting tool assembly for cutting a workpiece. The cutting tool assembly includes a cutting insert having an upper surface that has a quadrilateral shape so as to include first to fourth insert corner portions, and a shim configured to support the insert. The insert includes an upper surface and a lower surface on which first to sixth inclined mounting portions are respectively formed. The shim simultaneously supports the first to third inclined mounting portions, or simultaneously supports the fourth to sixth inclined mounting portions.

10 Claims, 16 Drawing Sheets

(52) U.S. Cl.
CPC ....... *B23B 2205/16* (2013.01); *B23B 2260/03* (2013.01); *B23B 2265/32* (2013.01)

(58) Field of Classification Search
CPC .... B23B 2200/0447; B23B 2200/0452; B23B 2200/082; B23B 2200/085; B23B 2200/086; B23B 2200/163; B23B 2200/0165; B23B 2200/3627; B23B 2205/12; B23B 2205/16; B23B 2260/03
See application file for complete search history.

(56) References Cited

U.S. PATENT DOCUMENTS

| | | | |
|---|---|---|---|
| 7,201,545 B2 | 4/2007 | Ejderklint | |
| 7,387,474 B2 | 6/2008 | Edler et al. | |
| 9,821,382 B2 * | 11/2017 | Daub | B23C 5/06 |
| 11,141,796 B2 * | 10/2021 | Shaheen | B23B 27/1611 |
| 2006/0083594 A1 | 4/2006 | Ejderklint | |
| 2006/0216121 A1 * | 9/2006 | Edler | B23B 27/1611 |
| | | | 407/104 |
| 2010/0061814 A1 | 3/2010 | Hecht | |
| 2011/0036226 A1 * | 2/2011 | Cohen | B23B 27/1662 |
| | | | 29/428 |
| 2012/0039675 A1 * | 2/2012 | Men | B23C 5/20 |
| | | | 407/40 |
| 2013/0051936 A1 * | 2/2013 | Satran | B23C 5/08 |
| | | | 407/42 |
| 2013/0236255 A1 | 9/2013 | Hecht | |
| 2016/0368062 A1 | 12/2016 | Hen | |
| 2017/0100778 A1 | 4/2017 | Lof et al. | |

FOREIGN PATENT DOCUMENTS

| | | |
|---|---|---|
| JP | 2005001024 | 1/2005 |
| JP | 2013078828 | 5/2013 |
| KR | 10-2014-0051708 | 5/2014 |
| RU | 2349425 C1 | 3/2009 |
| SU | 1526918 | 12/1989 |

OTHER PUBLICATIONS

Written Opinion dated Jul. 3, 2019, issued in counterpart International (PCT) Application (No. PCT/KR2018/003501).

* cited by examiner

INSERT AND CUTTING TOOL ASSEMBLY COMPRISING SAME

RELATED APPLICATIONS

This is a 35 USC 371 U.S. National Phase of International Application No. PCT/KR2019/003501 filed Mar. 26, 2019, and published as WO 2019/190165A1 on Oct. 3, 2019. Priority is claimed to Korean Application No. 10-2018-0036180 filed Mar. 28, 2018. The contents of the aforementioned applications are incorporated by reference in their entirety.

TECHNICAL FIELD

The present disclosure relates to an insert and a cutting tool assembly comprising same.

BACKGROUND ART

A cutting tool is mainly used for cutting an iron-based or non-iron-based metal and, when in use, is fixed to various machine tools. As a method of cutting a metal through the use of a cutting tool, there is known, for example, a method in which cutting is performed by bringing a cutting edge of a cutting tool into contact with a rotating metal workpiece. As another method, there is known a method in which a cutting insert having a cutting edge is fixed to a tool holder, the tool holder is fixed to a machine tool, and then the cutting insert is brought into contact with a workpiece fixed in advance while rotating the cutting insert through the rotation of the tool holder, thereby cutting the workpiece in a desired shape.

A cutting insert that makes direct contact with a workpiece is the most important factor in cutting a metal. Furthermore, the material and shape of the cutting insert affects the lifespan of a cutting tool and the machining quality. In addition, when a target work portion of a workpiece is to be cut and removed using a cutting insert, it is necessary to safely discharge metal scraps generated in the form of chips from a cutting area. Therefore, efforts have been made to develop a cutting insert capable of safely and reliably discharging chip-shaped metal scraps from a work area without interrupting a continuous cutting process or causing injury to the body of an operator.

DISCLOSURE OF INVENTION

Technical Problem

Various embodiments of the present disclosure provide a cutting tool assembly that includes a double-sided cutting insert configured to have four cutting corners, and a shim configured to support three sides of the cutting insert.

Solution to Problem

An insert for use in a cutting tool assembly for cutting a workpiece according to one embodiment of the present disclosure may include: first to fourth insert corner portions formed at respective corners of an upper surface of the insert, the upper surface having a quadrilateral shape; an insert middle portion disposed between the first to fourth insert corner portions and having a thickness direction centerline arranged in a direction perpendicular to the quadrilateral shape of the upper surface so as to pass through an insert center; a first inclined mounting portion formed between the first insert corner portion and the insert middle portion such that a vertical thickness of the first inclined mounting portion with respect to the quadrilateral shape decreases toward the thickness direction centerline; and second and third inclined mounting portions respectively formed in the second and fourth insert corner portions on the side of the third insert corner portion with respect to the thickness direction centerline such that vertical thicknesses of the second and third inclined mounting portions with respect to the quadrilateral shape increase toward the thickness direction centerline.

According to one embodiment, the insert may further include: a fourth inclined mounting portion formed between the third insert corner portion and the insert middle portion such that a vertical thickness of the fourth inclined mounting portion with respect to the quadrilateral shape decreases toward the thickness direction centerline; and fifth and sixth inclined mounting portions respectively formed in the second and fourth insert corner portions on the side of the first insert corner portion with respect to the thickness direction centerline such that vertical thicknesses of the fifth and sixth inclined mounting portions with respect to the quadrilateral shape increase toward the thickness direction centerline.

According to one embodiment, the insert may further include: a longitudinal centerline passing through a center of the insert so as to be perpendicular to the thickness direction centerline, wherein each of the first to third inclined mounting portions may include first to third contact points, and a line connecting the first contact point and the second or third contact point may form a predetermined angle with the longitudinal centerline.

According to one embodiment, the insert may further include: a first cutting portion and a second cutting portion respectively formed to extend from the second insert corner portion and the fourth insert corner portion to the first insert corner portion and the third insert corner portion and respectively configured to cut the workpiece, wherein each of the first cutting portion and the second cutting portion may include a first cutting edge and a second cutting edge configured to be contact with the workpiece, and the second and third contact points may be located on the upper side of the longitudinal centerline with respect to a straight line passing through the first contact point and extending parallel to the first cutting edge of the first cutting portion.

According to one embodiment, each of the first to third inclined mounting portions may include first to third mounting surfaces formed of flat surfaces.

According to one embodiment, the second and fifth inclined mounting portions may be configured to be inclined in opposite directions about the thickness direction centerline, and the third and sixth inclined mounting portions may be configured to be inclined in opposite directions about the thickness direction centerline.

According to one embodiment, each of the first cutting portion and the second cutting portion may include an uneven surface in which a plurality of convex surfaces and a plurality of concave surfaces are repeated.

According to one embodiment, the first cutting edge and the second cutting edge may be configured to form an angle between 40 degrees and 50 degrees.

According to one embodiment, the longitudinal centerline and each of the first and fourth inclined mounting portions may be configured to form an angle between 10 degrees and 15 degrees.

A cutting tool assembly for cutting a workpiece according to another embodiment of the present disclosure may include: an insert formed in a quadrilateral shape so as to include first to fourth insert corner portions, the insert including an insert middle portion disposed between the first to fourth insert corner portions and having a thickness direction centerline arranged in a direction perpendicular to the quadrilateral shape so as to pass through an insert center, a first cutting portion and a second cutting portion respectively formed to extend from the second insert corner portion and the fourth insert corner portion to the first insert corner portion and the third insert corner portion and respectively configured to cut the workpiece, a first inclined mounting portion formed between the first cutting portion and the insert middle portion and configured such that a vertical thickness of the first inclined mounting portion with respect to the quadrilateral shape decreases toward the thickness direction centerline arranged perpendicularly to the quadrilateral shape and passing through the insert center, and second and third inclined mounting portions respectively formed in the second and fourth insert corner portions on the side of the third insert corner portion with respect to the thickness direction centerline such that a vertical thickness of the second and third inclined mounting portions with respect to the quadrilateral shape increases toward the thickness direction centerline; and a shim configured to support the insert, the shim including a first inclined support portion configured to support the first inclined mounting portion, a second inclined support portion formed to extend from the first inclined support portion to one side and configured to support the second inclined mounting portion, and a third inclined support portion formed to extend from the first inclined support portion to the other side and configured to support the third inclined mounting portion.

According to one embodiment, the shim may be formed in a quadrilateral shape so as to include first to fourth shim corner portions, the second inclined support portion may be formed in the second shim corner portion, and the third inclined support portion may be formed in the fourth shim corner portion.

According to one embodiment, the shim may include a shim middle portion disposed between the first to fourth shim corner portions and having a thickness direction centerline arranged in a direction perpendicular to the quadrilateral shape so as to pass through a shim center, the first inclined support portion may be disposed on one side of the thickness direction centerline, and the second and third inclined support portions may be disposed on the other side of the thickness direction centerline.

According to one embodiment, the shim middle portion may include a concave portion formed between the second inclined support portion and the third inclined support portion so as to be concave toward the thickness direction centerline.

A cutting tool assembly for cutting a workpiece according to a further embodiment of the present disclosure may include: an insert including first to fourth cutting portions configured to cut the workpiece and an insert middle portion having a thickness direction centerline arranged in a direction perpendicular to a quadrilateral shape so as to pass through an insert center, the insert including an upper surface having a first cutting portion inclined in a first direction toward the insert middle portion, a second cutting portion inclined in a second direction toward the insert middle portion, three inclined mounting portions inclined in the first direction and three inclined mounting portions inclined in the second direction, and a lower surface having a third cutting portion inclined in the second direction toward the insert middle portion, a fourth cutting portion inclined in the first direction toward the insert middle portion, three inclined mounting portions inclined in the second direction and three inclined mounting portions inclined in the first direction; a holder having a receiving portion configured to receive the insert; and a clamp configured to support the upper surface or the lower surface of the insert such that the insert is received in the receiving portion.

According to one embodiment, the three inclined mounting portions inclined in the first direction includes a first inclined mounting portion formed between the first insert corner portion and the insert middle portion such that a vertical thickness of the first inclined mounting portion with respect to the quadrilateral shape decreases toward the thickness direction centerline, and second and third inclined mounting portions respectively formed in the second and fourth insert corner portions on the side of the third insert corner portion with respect to the thickness direction centerline such that a vertical thickness of the second and third inclined mounting portions with respect to the quadrilateral shape increases toward the thickness direction centerline, and the three inclined mounting portions inclined in the second direction includes a fourth inclined mounting portion formed between the third insert corner portion and the insert middle portion such that a vertical thickness of the fourth inclined mounting portion with respect to the quadrilateral shape decreases toward the thickness direction centerline, and fifth and sixth inclined mounting portions respectively formed in the second and fourth insert corner portions on the side of the first insert corner portion with respect to the thickness direction centerline such that a vertical thickness of the and fifth and sixth inclined mounting portions with respect to the quadrilateral shape increases toward the thickness direction centerline.

According to one embodiment, a bottom surface of the receiving portion may be configured to have a shape complementary to the upper surface or the lower surface of the insert.

According to one embodiment, the holder may be provided with a groove for receiving a part of the clamp, and the clamp may include a first protrusion inserted into an opening of the insert and a second protrusion inserted into the groove.

Advantageous Effects of Invention

According to various embodiments of the present disclosure, a cutting chip having a certain shape can be generated in a process of cutting a workpiece using a cutting insert. Furthermore, an increase in cutting speed makes it possible to improve the productivity of a cutting process. In addition, it is possible to perform both a typical turning operation (forward turning) and a back turning operation (backward turning). In particular, in the case of backward turning in which a positive cutting edge has to be formed in terms of a working method, despite the formation of the positive cutting edge, it is possible to stably mount an insert without interfering with a chip flow.

MODE FOR THE INVENTION

Figure 1:
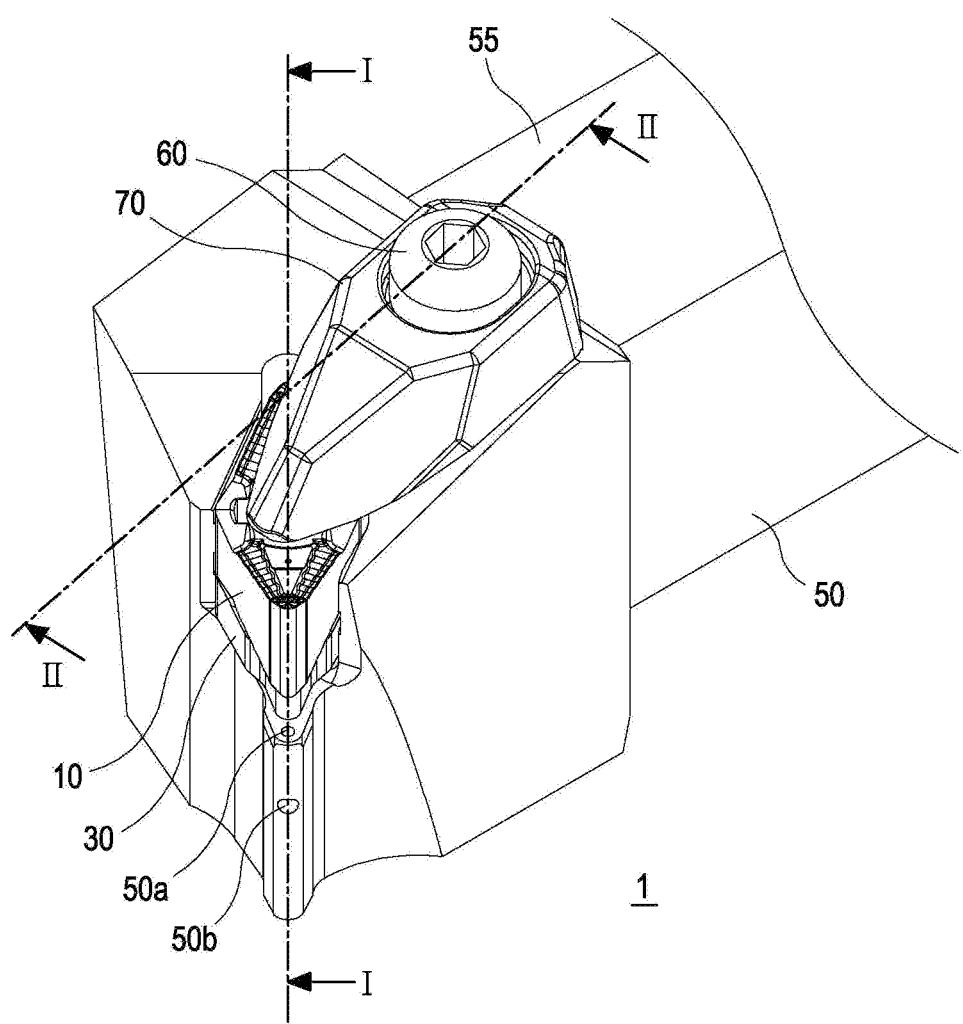
FIG. 1 is a perspective view showing a cutting tool assembly according to one embodiment of the present disclosure.

Embodiments of the present disclosure are illustrated for the purpose of explaining the technical idea of the present disclosure. The scope of the rights according to the present disclosure is not limited to the embodiments presented below or the detailed descriptions of such embodiments.

All technical and scientific terms used in the present disclosure have the meaning generally understood by those of ordinary skill in the art to which the present disclosure pertains, unless otherwise defined. All terms used in the present disclosure are chosen for the purpose of more clearly describing the present disclosure and are not chosen to limit the scope of rights according to the present disclosure.

As used in the present disclosure, expressions such as "comprising", "including", "having", and the like are to be understood as open-ended terms having the possibility of encompassing other embodiments, unless otherwise mentioned in the phrase or sentence containing such expressions.

The singular form described in the present disclosure may include a plural meaning, unless otherwise mentioned. This applies equally to the singular form recited in the claims.

As used in the present disclosure, the expressions such as "first", "second" and the like are used to distinguish a plurality of components from each other and are not intended to limit the order or importance of the components.

The dimensions and numerical values set forth in this disclosure are not limited to the dimensions and numerical values set forth. Unless otherwise specified, these dimensions and numerical values may be understood to mean the stated values and the equivalent ranges encompassing them. For example, the dimension of '45 degrees' set forth in this disclosure may be understood to include 'about 45 degrees'.

In the present disclosure, the long axis direction of an insert or a shim may be defined as an 'X-axis direction'. In addition, the short axis direction of an insert or a shim may be defined as a 'Y-axis direction'. Furthermore, a direction parallel to the thickness direction of an insert or a shim and perpendicular to the X-axis direction and the Y-axis direction may be defined as a 'Z-axis direction'.

In the present disclosure, the thickness direction centerline may be defined as a line arranged in a direction perpendicular to the quadrilateral shape of an insert or a shim and passing through the center of an insert or the center of a shim. Furthermore, the thickness direction centerline may be arranged parallel to the Z-axis direction.

In the present disclosure, the longitudinal centerline may be defined as a line passing through the center of an insert or the center of a shim so as to be perpendicular to the thickness direction centerline of an insert or a shim. Furthermore, the longitudinal centerline may be arranged parallel to the X-axis direction.

Hereinafter, descriptions are made as to embodiments of the present disclosure with reference to the accompanying drawings. In the accompanying drawings, the same or corresponding elements are denoted by the same reference numerals. In the following descriptions of the embodiments, descriptions of the same or corresponding elements may be omitted. However, even if the descriptions of elements are omitted, it is not intended that such elements are not included in a certain embodiment.

FIG. 1 is a perspective view showing a cutting tool assembly 1 according to one embodiment of the present disclosure.

The cutting tool assembly 1 may be mounted on a cutting machine (not shown) for cutting and machining a workpiece t into a desired shape. The cutting tool assembly 1 may include an insert 10, a shim 30, a clamp 70, a holder 50 and a first screw 60. The lower surface of the insert 10 may be supported by the shim 30, and the upper surface thereof can be supported by the clamp 70. Alternatively, the insert 10 may be turned upside down so that the upper surface thereof is supported by the shim 30 and the lower surface thereof is supported by the clamp 70. The first screw 60 may press the clamp 70 toward the holder 50. In addition, the cutting machine (not shown) may hold a main body 55 of the holder 50.

The line I-I shown in FIG. 1 may correspond to the long axis direction of the insert 10, and the line II-II may correspond to the long axis direction of the clamp 70. The I-I line and the II-II line may form a predetermined angle. The predetermined angle may be, for example, an acute angle smaller than 90 degrees. Thus, the clamp 70 may support a larger area of the upper or lower surface of the insert 10.

The insert 10 may be made of a material that satisfies conditions such as a high temperature hardness which is enough to withstand a high temperature generated during machining, a strength at which the insert 10 is not easily broken or damaged by impact or vibration generated during cutting, a shapability with which the insert 10 can be formed into a desired shape, and the like. Examples of the material of the insert 10 may include, but are not limited to, cast alloy steel, cemented carbide, or cermet which is a sintered composite of ceramics and a metal.

Figure 2:
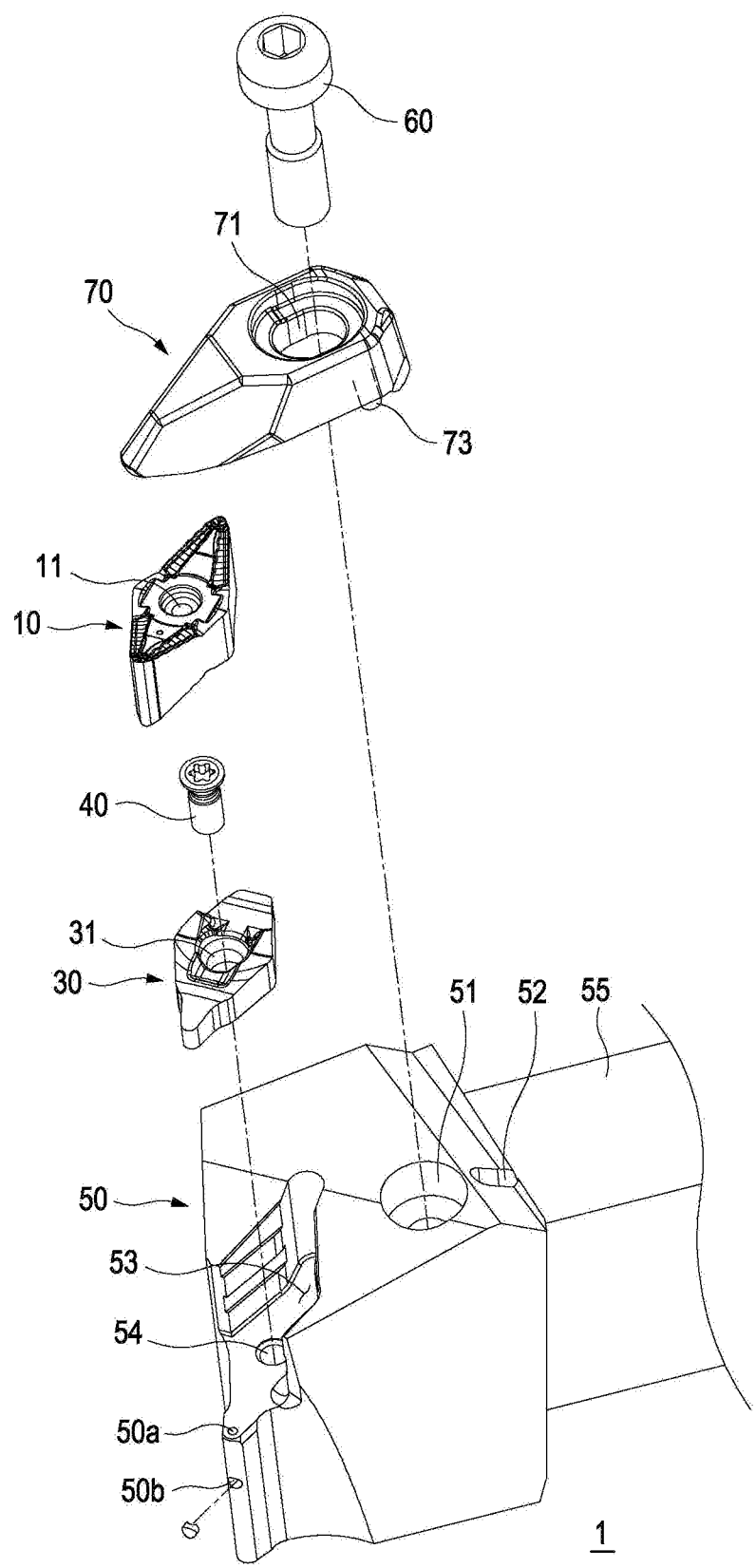
FIG. 2 is an exploded perspective view showing an exploded state of the cutting tool assembly shown in FIG. 1.

FIG. 2 is an exploded perspective view showing an exploded state of the cutting tool assembly 1 shown in FIG. 1.

In one embodiment, the holder 50 may be provided with a receiving portion 53 for receiving an assembly of the insert 10 and the shim 30. The receiving portion 53 may have a shape corresponding to the assembly of the insert 10 and the shim 30. A second screw 40 may penetrate an opening 31 formed at the center of the shim 30. The second screw 40 may be coupled to an opening 54 formed on the lower surface of the receiving portion 53 so that the shim 30 can be fixed to the holder 50.

The clamp 70 may be a 'T-shaped' clamp with an opening 71 formed therein. The holder 50 may be provided with a screw receiving portion 51 for making coupling with the first screw 60. The first screw 60 may penetrate the opening 71 of the clamp 70 and may fix the clamp 70 to the holder 50. In this process, the clamp 70 may be configured to press the insert 10 toward the holder 50 in a direction opposite to the direction in which the shim 30 supports the insert 10.

Figure 3:
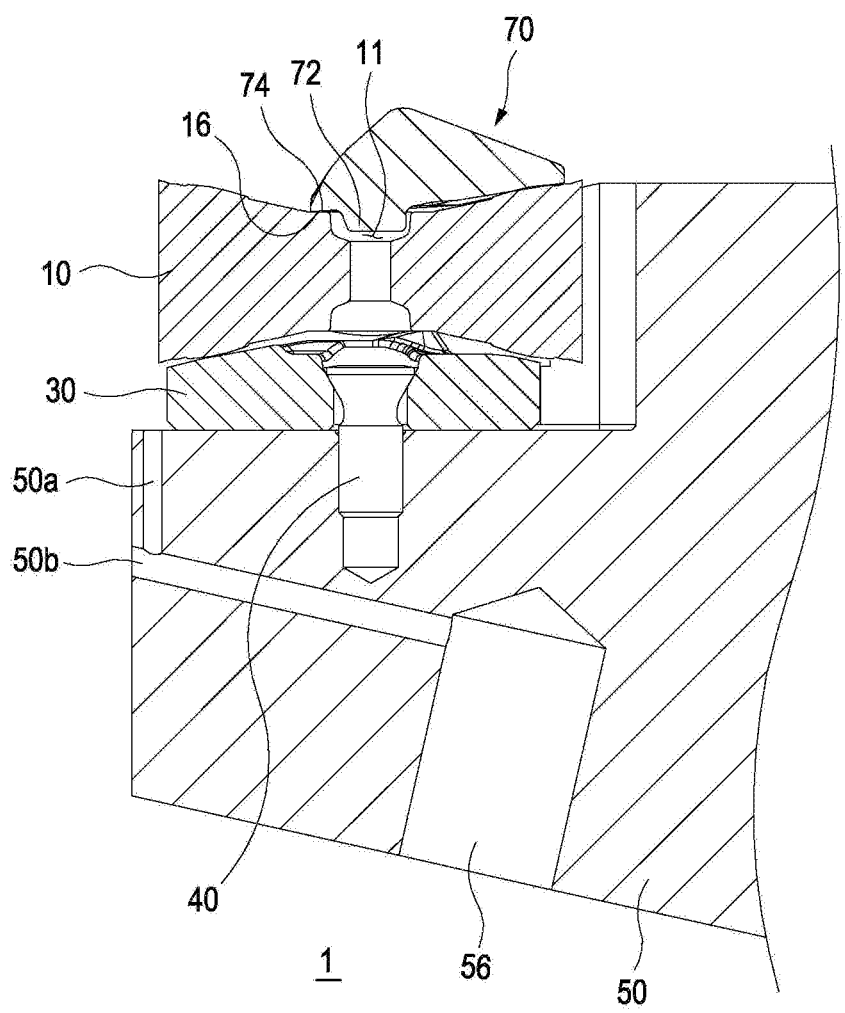
FIG. 3 is a sectional view of the cutting tool assembly shown in FIG. 1, which is taken along line I-I.
Figure 4:
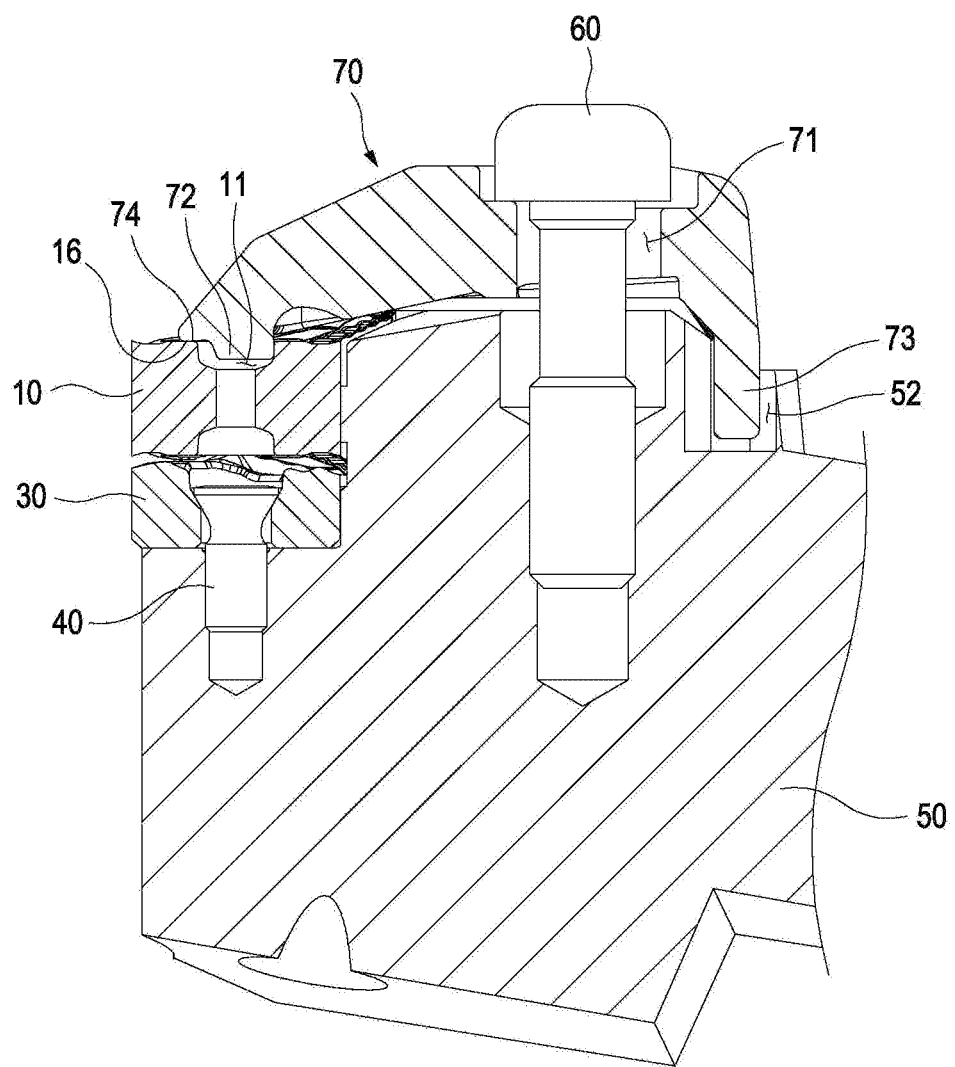
FIG. 4 is a sectional view of the cutting tool assembly shown in FIG. 1, which is taken along line II-II.

FIG. 3 is a sectional view of the cutting tool assembly 1 shown in FIG. 1, which is taken along line I-I. FIG. 4 is a sectional view of the cutting tool assembly 1 shown in FIG. 1, which is taken along line II-II.

Referring to FIG. 3, a discharge path 56 may be formed in the holder 50. A fluid may be discharged through the discharge path 56 to discharge ports 50a and 50b formed in the holder 50. The discharged fluid may remove a chip generated in a cutting process of a workpiece from ae work surface of the workpiece. In addition, the discharged fluid may cool the workpiece to prevent the chip from fusing to the insert 10.

A first protrusion 72 and a second protrusion 73 protruding in a direction in which the insert 10 is disposed may be formed in a lower portion of the clamp 70. The first protrusion 72 may be configured to be inserted into at least a portion of the opening 11 of the insert 10. Furthermore, the holder 50 may also be provided with a groove 52, and the second protrusion 73 may be configured to be inserted into at least a portion of the groove 52. The clamp 70 may be coupled to the holder 50 while moving toward the insert 10 by the first screw 60 and may press and support the upper surface of the insert 10 in this process. Since the first and second projections 71 and 72 of the clamp 70 are inserted into the opening 11 of the insert 10 and the groove 52 of the holder 50, respectively, it is possible to secure a dual-side support structure of the clamp 70 so that the clamp 70 can be stably fixed to the holder 50.

In one embodiment, the clamp 70 may include an inner surface 74 from which the first protrusion 72 protrudes. The inner surface 74 may be configured to be contact with a part of a first insert middle portion 16 of the insert 10. Thus, in the process of coupling the insert 10 to the holder 50, the lower surface of the insert 10 may be supported by the shim 30 and the upper surface of the insert 10 may be supported by the inner surface 74 of the clamp 70 that makes contact with a part of the first insert middle portion 16.

Figure 5:
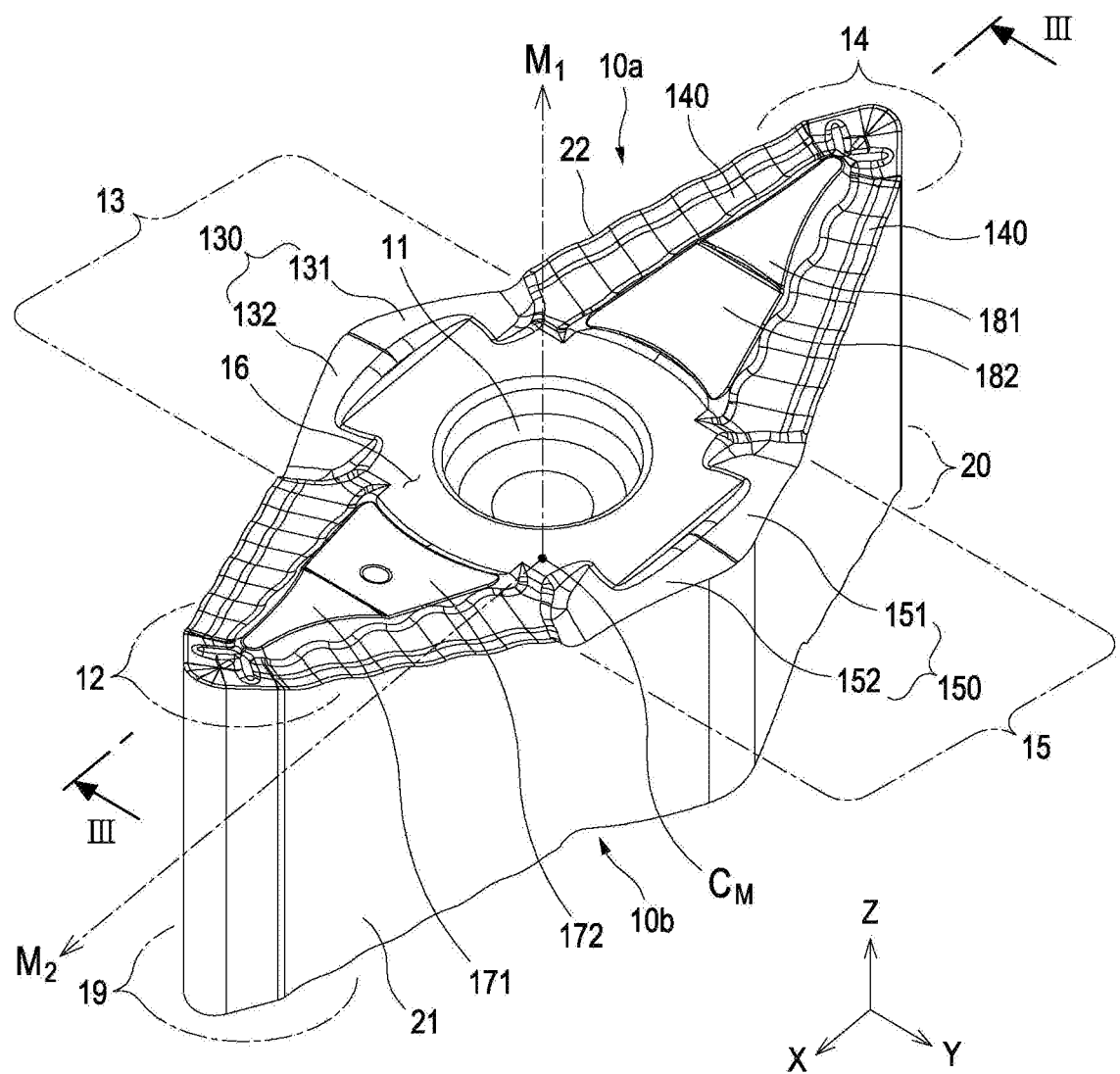
FIG. 5 is a perspective view showing an insert according to one embodiment of the present disclosure.

FIG. 5 is a perspective view showing the insert 10 according to one embodiment of the present disclosure.

Referring to FIG. 5, the thickness direction centerline $M_1$ parallel to the Z-axis direction and the longitudinal centerline $M_2$ parallel to the X-axis direction may intersect at the center of mass $C_M$ of the insert 10.

The insert 10 may be used as a cutting insert and may be selected from among a plurality of inserts having various sizes of cutting angles, rake angles or thicknesses. In addition, the insert 10 may be selected from among the plurality of inserts according to the conditions such as the material of the workpiece, the processing conditions, the degree of wear, and the like.

The insert 10 may be formed in a quadrilateral shape so as to include first to fourth insert corner portions 12, 13, 14 and 15. The quadrilateral shape may be, for example, a rhombus shape. The first and third insert corner portions 12 and 14 may be disposed along the X-axis direction. Furthermore, the second and fourth insert corner portions 13 and 15 may be arranged along the Y-axis direction. That is, the distance between the first and third insert corner portions 12 and 14 may be the long axis of a rhombus, and the distance between the second and fourth insert corner portions 13 and 15 may be the short axis of a rhombus.

A first cutting portion 120 may be formed to extend from each of the second insert corner portion 13 and the fourth insert corner portion 15 toward the first insert corner portion 12. A second cutting portion 140 may be formed to extend from each of the second insert corner portion 13 and the fourth insert corner portion 15 toward the third insert corner portion 14. In addition, the first and second cutting portions 120 and 140 may be provided with sharp cutting edges and may be configured to be contact with the workpiece.

According to one embodiment, the insert 10 may include an upper surface 10a and a lower surface 10b configured to have a symmetrical shape with respect to the upper surface 10a about the longitudinal centerline $M_1$. Furthermore, the first insert middle portion 16 including a thickness direction centerline $M_2$ and having an opening 11 formed therein may be disposed between the first insert corner portion 12 and the third insert corner portion 14. The opening 11 may be formed to penetrate the first insert middle portion 16 in the Z-axis direction. That is, the upper surface 10a may be disposed on the upper side of the longitudinal centerline $M_2$ longitudinally passing through the center of mass $C_M$ located in the first insert middle portion 16, and the lower surface 10b may be disposed on the lower side of the longitudinal centerline $M_2$. In addition, a first side surface 21 surrounding the fourth insert corner portion 15 and a second side surface 22 surrounding the first insert corner portion 12 may be disposed between the upper surface 10a and the lower surface 10b.

First to sixth inclined mounting portions may be formed on the upper surface 10a, and seventh to twelfth inclined mounting portions having the same structure as the first to sixth inclined mounting portions of the upper surface 10a may be formed on the lower surface 10b. The detailed structure of the first to twelfth inclined mounting portions will be described below.

According to one embodiment, a first inclined mounting portion 171 may be formed between the first cutting portion 120 and the first insert middle portion 16. In addition, a fourth inclined mounting portion 181 may be formed between the second cutting portion 140 and the first insert middle portion 16. The first and fourth inclined mounting portions 171 and 181 may be configured such that the thicknesses thereof in the cross-sectional direction including the X-axis and the Z-axis are greater than the thicknesses of the first and second cutting portions 120 and 140, respectively.

A first inclined connection portion 172 may be formed between the first insert middle portion 16 and the first inclined mounting portion 171. Furthermore, a second inclined connection portion 182 may be formed between the first insert middle portion 16 and the fourth inclined mounting portion 181. The first inclined connection portion 172 may have a lower Z-axis direction height than the first inclined mounting portion 171. In addition, the second inclined connection portion 182 may have a lower Z-axis direction height than the second inclined mounting portion 181.

The first and fourth inclined mounting portions 171 and 181 are respectively formed such that the vertical thickness thereof with respect to the quadrilateral shape of the upper surface 10a decreases toward the centerline $M_1$ between the first and third insert corner portions 12 and 14 and the first insert middle portion 16. That is, the first and fourth inclined mounting portions 171 and 181 may be respectively inclined toward the first insert middle portion 16. Therefore, the signs of the slopes of the first and fourth inclined mounting portions 171 and 181 may be opposite to each other. In addition, the first and fourth inclined mounting portions 171 and 181 may have a shape symmetrical about the thickness direction centerline $M_1$.

According to one embodiment, a first seat portion 130 and a second seat portion 150 may be formed at positions adjacent to the first insert middle portion 16. The first seat portion 130 may be formed at the second insert corner portion 13, and the second seat portion 150 may be formed at the fourth insert corner portion 15. Each of the X-axis direction opposite end portions of the first seat portion 130 and the X-axis direction opposite end portions of the second seat portion 150 may have a shape depressed toward the longitudinal centerline $M_2$.

Second and fifth inclined mounting portions 131 and 132 may be formed in the first seat portion 130. Third and sixth inclined mounting portions 151 and 152 may be formed in the second seat portion 150. The second and fifth inclined mounting portions 131 and 132 may have a shape symmetrical with respect to each other about the thickness direction centerline $M_1$. In addition, the third and sixth inclined mounting portions 151 and 152 may have a shape symmetrical with respect to each other about the thickness direction centerline $M_1$.

Figure 6:
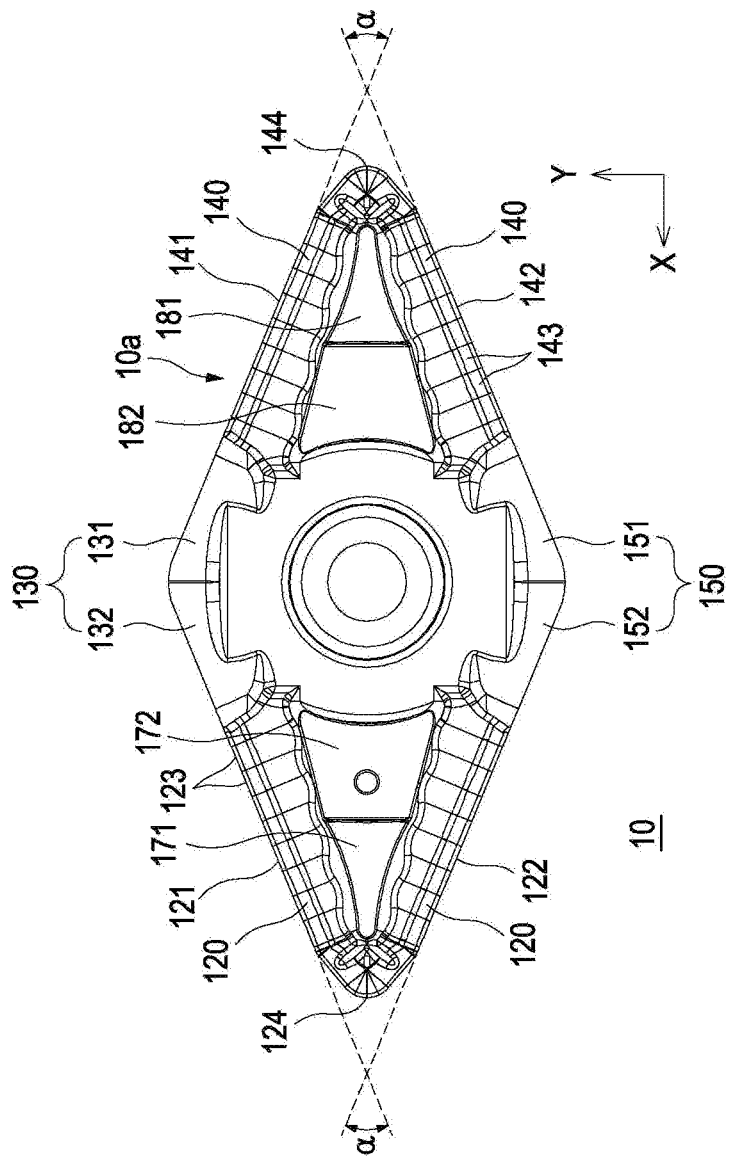
FIG. 6 is a top view showing an upper surface of the insert shown in FIG. 5.

FIG. 6 is a top view showing the upper surface 10a of the insert 10 shown in FIG. 5.

The upper surface 10a of the insert 10 may have a rhombus shape in the direction of a plane including the X axis and the Y axis. According to one embodiment, the first cutting portion 120 may include a first cutting edge 121 and a second cutting edge 122 configured to be contact with the workpiece. The second cutting portion 140 may include a third cutting edge 141 and a fourth cutting edge 142 configured to be contact with the workpiece. In addition, rounded corner portions 124 and 144 may be formed at a portion where the first and second cutting edges 121 and 122 are joined and at a portion where the third and fourth cutting edges 141 and 142 are joined.

According to one embodiment, the first cutting edge 121 and the second cutting edge 122 may be configured to form a predetermined angle α, and the third cutting edge 141 and the fourth edge 142 may be configured to form a predetermined angle α. The predetermined angle α may be set to an angle between 40 degrees and 50 degrees. As an example, the predetermined angle α may be 45 degrees.

According to one embodiment, each of the first and second cutting portions 120 and 140 may include an uneven surface 123 or 143 configured such that a plurality of convex surfaces and a plurality of concave surfaces are repeated. The uneven surfaces 123 and 143 may be repeatedly arranged in the first and second cutting portions 120 and 140. The first and second cutting edges 121 and 142 and the third and fourth cutting edges 141 and 142 may be configured such that concave portions and convex portions are repeated. As a result, even if the first and second cutting edges 121 and 142 and the third and fourth cutting edges 141 and 142 are partially worn, they are not chamfered at once, whereby a sharp blade shape can be maintained for a long time. It is therefore possible to improve the wear lifetime of the first and second cutting portions 120 and 140.

Figure 7:
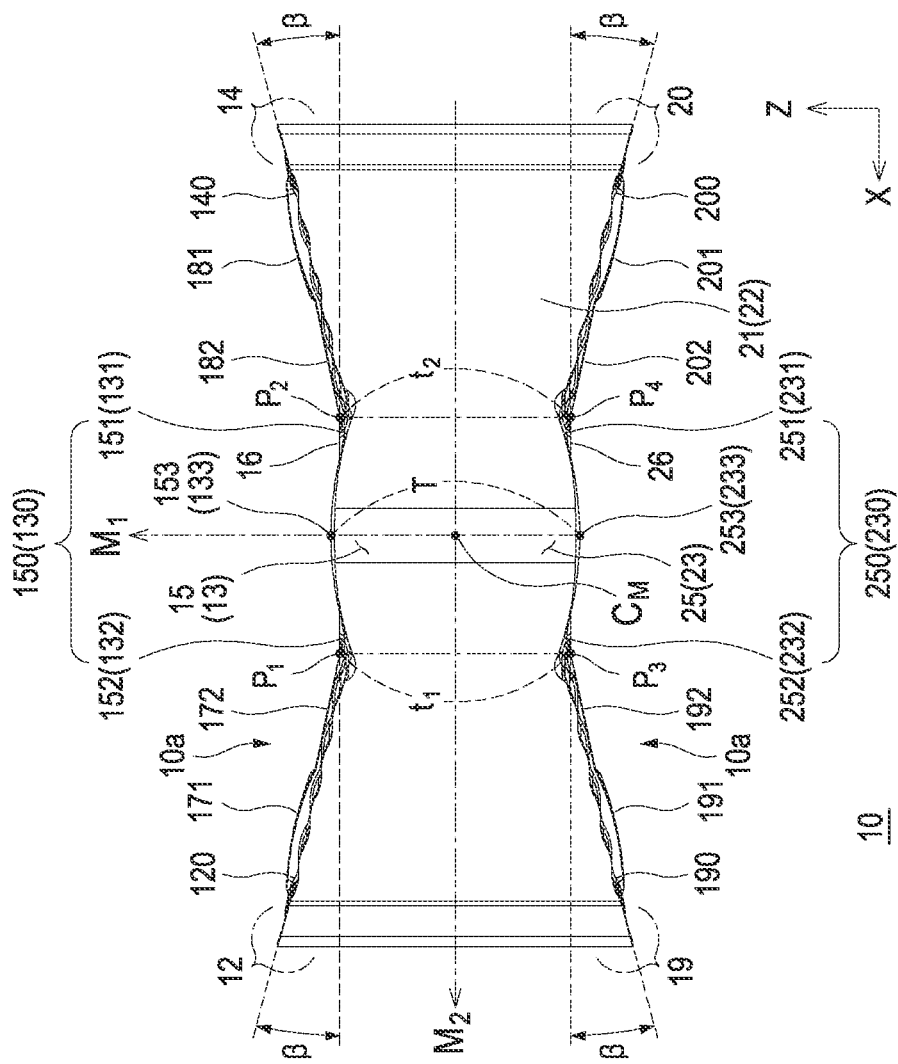
FIG. 7 is a side view showing a first side surface of the insert shown in FIG. 5.

FIG. 7 is a side view showing the first side surface 21 of the insert 10 shown in FIG. 5. In FIG. 7, the insert 10 is shown in the direction of looking at the first side surface 21. Reference numerals in parentheses in FIG. 7 denote components viewed on the side of the second side surface 22.

The lower surface 10b of the insert 10 may include fifth to eighth corner portions 19, 23, 20, 25. A second insert middle portion 26 may be formed between the fifth and seventh corner portions 19 and 20 facing each other. A third seat portion 230 may be formed at the sixth corner portion 23, and a fourth seat portion 250 may be formed at the eighth corner portion 25.

In one embodiment, the insert 10 may include first to fourth cutting portions 120, 140, 190 and 200, each of which is configured to cut a workpiece. The first and second cutting portions 120 and 140 may be formed on the upper surface 10a of the insert 10, and the third and fourth cutting portions 190 and 200 may be formed on the lower surface 10b of the insert 10. Therefore, the insert 10 can use both the upper surface 10a and the lower surface 10b, so that the workpiece can be cut by utilizing four different arrangements in the cutting tool assembly 1. In addition, the first to fourth cutting portions 120, 140, 190 and 200 may form the same angle with the contact surface when they are in contact with the workpiece.

On the upper surface 10a of the insert 10, the first cutting portion 120 may be inclined in a first direction, and the second cutting portion 140 may be inclined in a second direction different from the first direction. For example, the slope in the first direction and the slope in the second direction may have opposite signs. In addition, the first to third inclined mounting portions 171, 131 and 151 may be respectively inclined in the first direction. The fourth to sixth inclined mounting portions 181, 132 and 152 may be respectively inclined in the second direction.

On the lower surface 10b of the insert 10, a seventh inclined mounting portion 191 may be formed between the third cutting portion 190 and the second insert middle portion 26, and a tenth inclined mounting portion 201 may be formed between the fourth cutting portion 200 and the second insert middle portion 26. Furthermore, the seventh and tenth inclined mounting portions 191 and 201 may be configured such that the vertical thickness thereof with respect to the quadrilateral shape decreases from the third and fourth cutting portions 190 and 200 toward the thickness direction centerline $M_1$.

Eighth and eleventh inclined mounting portions 231 and 232 may be formed on the third seat portion 230. Ninth and twelfth inclined mounting portions 251 and 252 may be formed on the fourth seat portion 250. Furthermore, the eighth and eleventh inclined mounting portions 231 and 232 may be configured to be inclined in opposite directions with respect to the thickness direction centerline $M_1$, and the ninth and twelfth inclined mounting portions 251 and 252 may be configured to be inclined in opposite directions with respect to the thickness direction centerline $M_1$.

On the lower surface 10b of the insert 10, the third cutting portion 190 may be inclined in a second direction, and the fourth cutting portion 200 is inclined in a first direction. The seventh to ninth inclined mounting portions 191, 231 and 251 may be respectively inclined in the second direction. The tenth to twelfth inclined mounting portions 201, 232 and 252 may be respectively inclined in the first direction.

According to one embodiment, the longitudinal centerline $M_2$ and the first and third cutting portions 120 and 190 may be configured to form a predetermined angle β, and the longitudinal centerline $M_2$ and the second and fourth cutting portions 180 and 200 may be configured to form a predetermined angle β. The predetermined angle β may be an angle between 10 degrees and 15 degrees. As an example, the predetermined angle β may be 12 degrees.

A third inclined connection portion 192 may be formed between the second insert middle portion 26 and the seventh inclined mounting portion 191. In addition, a fourth inclined connection portion 202 may be formed between the second insert middle portion 26 and the tenth inclined mounting portion 201. In a state in which the lower surface 10b is positioned on the upper side with respect to the Z axis, the third inclined connection portion 192 may have a lower Z-axis direction height than the seventh inclined mounting portion 191, and the fourth inclined connection portion 202 may have a lower Z-axis direction height than the tenth inclined mounting portion 201.

In one embodiment, the Z-axis direction thickness T between the highest points 133 and 153 of the first and second seat portions 130 and 150 and the highest points 233 and 253 of the third and fourth seat portions 130 and 150 may be greater than the sum of the thickness of the first insert center section 16 and the thickness of the second insert center section 26. Furthermore, the thickness T may be greater than the Z-axis direction thickness $t_1$ between the starting point $P_1$ of the first inclined connection portion 172 and the starting point $P_3$ of the third inclined connection portion 192 or the Z-axis direction thickness $t_2$ between the starting point $P_2$ of the second inclined connection portion 182 and the starting point $P_4$ of the fourth inclined connection portion 202. As a result, the short-axis direction thickness of the corner portion of the insert 10 can be reinforced and, therefore, the short-axis direction strength of the insert 10 can be improved.

Figure 8:
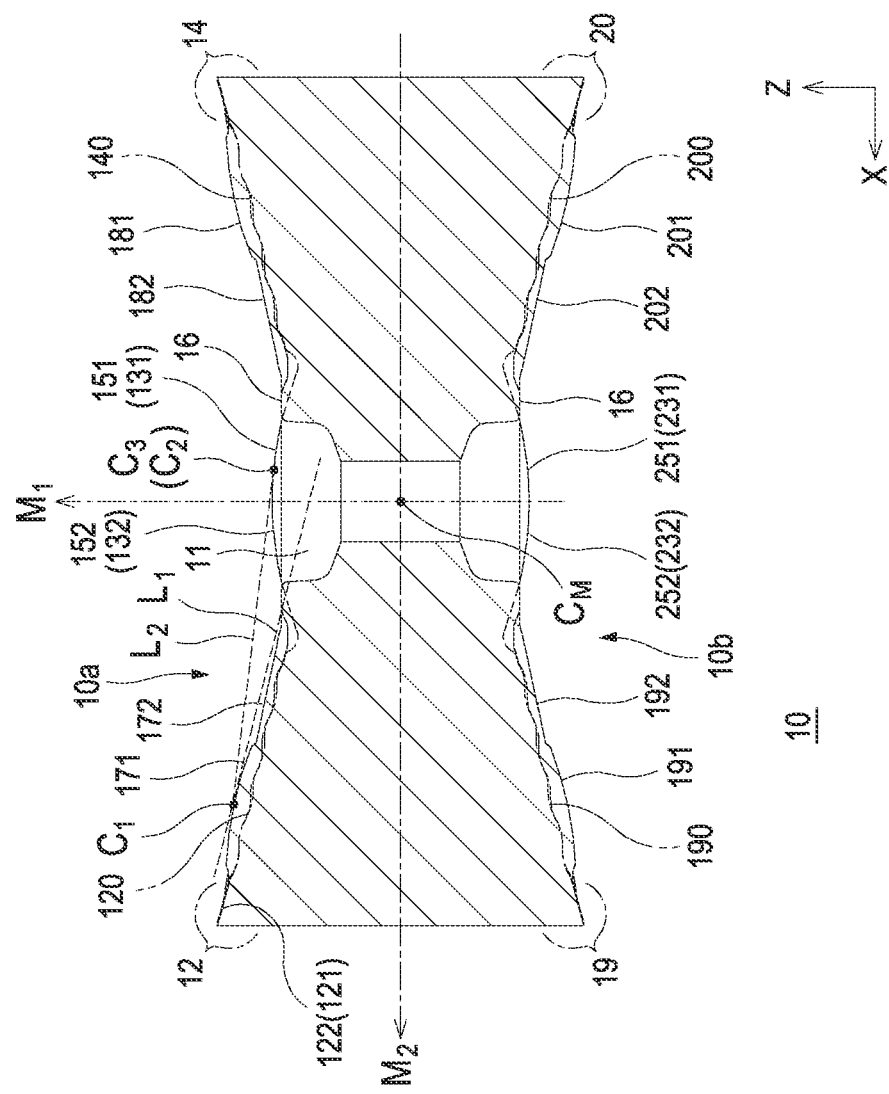
FIG. 8 is a sectional view of the insert shown in FIG. 5, which is taken along line III-III.

FIG. 8 is a sectional view of the insert 10 shown in FIG. 5, which is taken along line III-III.

On the upper surface 10a of the insert 10, each of the first to sixth inclined mounting portions 171, 181, 131, 151, 132 and 152 may be formed of a curved surface which is convex with respect to the longitudinal centerline $M_2$. For example, each of the first to sixth inclined mounting portions 171, 181, 131, 151, 132 and 152 may be formed as a part of a spherical surface. This makes it possible to induce point-to-point contact between the first to sixth inclined mounting portions 171, 181, 131, 151, 132 and 152 and the shim or the holder supporting them.

On the lower surface 10b of the insert 10, each of the seventh to twelfth inclined mounting portions 191, 231, 251, 201, 232 and 252 may be formed of a curved surface which is convex with respect to the longitudinal centerline $M_2$. For example, each of the seventh to twelfth inclined mounting portions 191, 231, 251, 201, 232 and 252 may be formed as a part of a spherical surface. This makes it possible to induce point-to-point contact between the seventh to twelfth inclined mounting portions 191, 231, 251, 201, 232 and 252 and the shim or the holder supporting them.

In one embodiment, each of the first to third inclined mounting portions 171, 131 and 151 may include first to third contact points $C_1$, $C_2$ and $C_3$. The second connection line $L_2$ connecting the first contact point $C_1$ and the second or third contact point $C_2$ or $C_3$ may form a predetermined angle with the longitudinal centerline $M_1$. Furthermore, the first connection line $L_1$ extending parallel to the first and second cutting edges 121 and 122 of the first cutting portion 120 while passing through the first contact point $C_1$ may not be parallel to the second connection line $L_2$. In addition, the second and third contact points $C_2$ and $C_3$ may be located on the upper side of the first connection line $L_1$ with respect to the longitudinal centerline $M_2$.

In another embodiment, the first to sixth inclined mounting portions 171, 181, 131, 151, 132 and 152 may include first to sixth mounting surfaces, each of which is formed of a flat surface. In addition, the seventh to twelfth inclined mounting portions 191, 231, 251, 201, 232 and 252 may include seventh to twelfth mounting surfaces, each of which is formed of a flat surface.

The first and seventh inclined mounting portions 171 and 191 may be disposed above the first and third cutting portions 120 and 190 with respect to the longitudinal centerline $M_2$. The second and tenth inclined mounting portions 181 and 201 may be disposed above the second and fourth cutting portions 140 and 200 with respect to the longitudinal centerline $M_2$. Thus, the shim 30 may be configured so that, when the insert 10 is supported by the shim 30, the shim 30 does not be contact with the first to fourth cutting portions 120, 140, 190 and 200 but be contact with one of the first, second, seventh and tenth inclined mounting portions 171, 181, 191 and 201. Accordingly, even though the insert 10 is pressed by the shim 30, the first to fourth cutting portions 120, 140, 190 and 200 may not be damaged.

Figure 9:
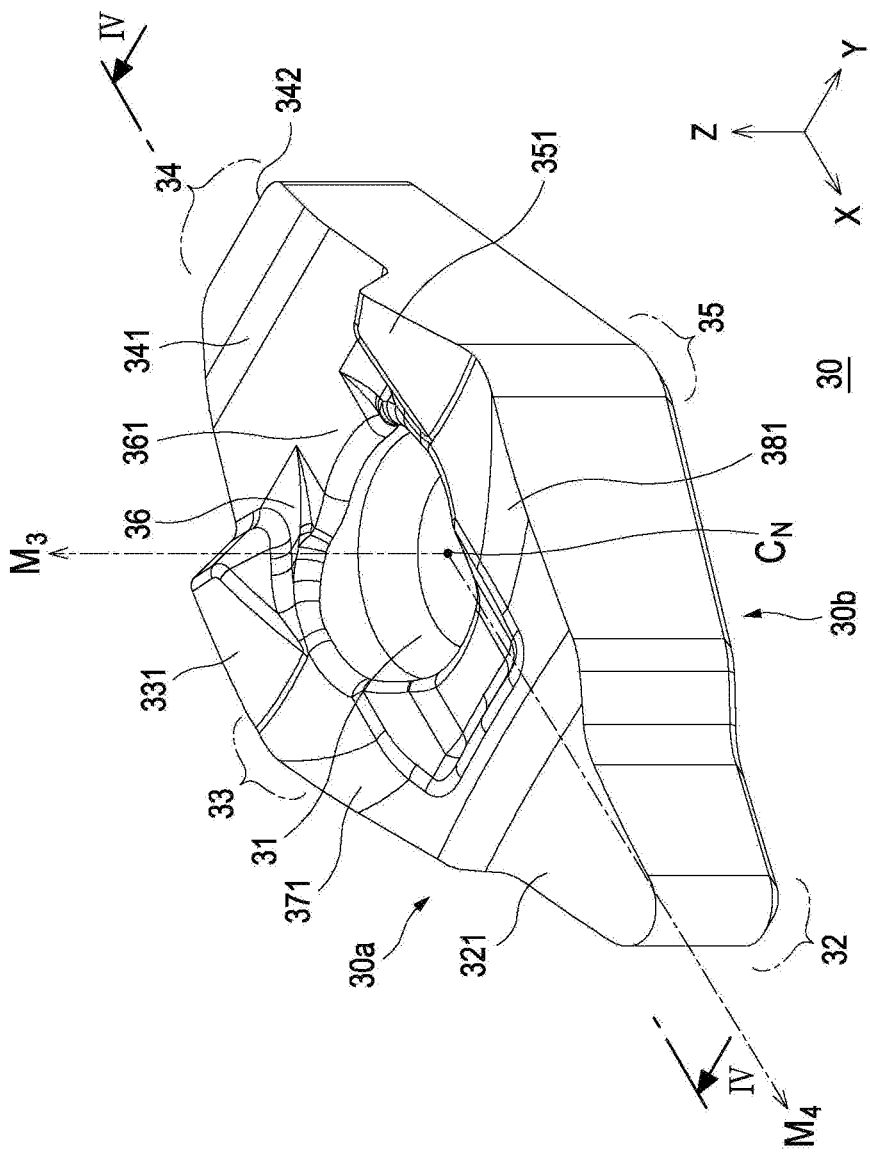
FIG. 9 is a perspective view showing a shim according to one embodiment of the present disclosure.

FIG. 9 is a perspective view showing the shim 30 according to one embodiment of the present disclosure.

The shim 30 may be configured to support the insert 10. The upper surface 30a and the lower surface 30b of the shim 30 may have an asymmetric shape with respect to the longitudinal centerline $M_4$. In addition, the shim 30 may have an asymmetrical shape with respect to the thickness direction centerline $M_3$. Therefore, the shim center $C_N$ corresponds to the geometric center of the shim 30 and does not correspond to the center of mass thereof. The upper surface 30a may include a plurality of inclined support portions. The lower surface 30b may be composed of a generally flat surface.

According to one embodiment, the shim 30 may be formed in a quadrilateral shape so as to include the first to fourth shim corner portions 32, 33, 34 and 35. The quadrilateral shape may be, for example, a generally rhombic shape. A shim middle portion 36 having an opening 31 may be formed between the second corner portion 33 and the fourth corner portion 35. In addition, the height of the second and fourth corner portions 33 and 35 may be larger in the Z-axis direction than the height of the shim middle portion 36. Moreover, an inclined portion 341 and an end surface 342 cut from the end portion so as to be perpendicular to the X axis may be formed in the third corner portion 34.

A first inclined support portion 321 may be formed between the first shim corner portion 32, the second shim corner portion 33 and the third shim corner portion 34. The first inclined support portion 321 may be composed of one continuous surface. A second inclined support portion 331 may be formed in the second shim corner portion 33. Furthermore, a third inclined support portion 351 may be formed in the fourth shim corner portion 35. Referring to FIG. 9, the second and third inclined support portions 331 and 351 may be configured so as to be connected to the first inclined support portion 321 without being disconnected therefrom.

In one embodiment, the first to third inclined support portions 321, 331 and 351 may be formed of a curved surface which is convex with respect to the longitudinal centerline $M_4$. In another embodiment, the first to third inclined support portions 321, 331 and 351 may include first to third support surfaces, each of which is formed of a flat surface and configured to be contact with the shim 10.

A first curved surface 371 may be formed between the first inclined support portion 321 and the second inclined support portion 331. Furthermore, a second curved surface 381 may be formed between the first inclined support portion 321 and the third inclined support portion 331. Each of the first and second curved surfaces 371 and 381 may include a plurality of curved surfaces having different curvatures. In addition, the first and second curved surfaces 371 and 381 may be concave toward the longitudinal centerline $M_4$ so as not to be contact with the insert 10.

Referring to FIG. 7, the first inclined support portion 321 may be configured to be contact with one of the first, second, seventh and tenth inclined mounting portions 171, 181, 191 and 201 of the insert 10. The second inclined support portion 331 may be configured to contact and support one of the second, sixth, eighth and twelfth inclined mounting portions 131, 152, 231 and 252 of the insert 10. The third inclined support portion 351 may be configured to contact and support one of the third, fifth, ninth and eleventh inclined mounting portions 151, 132, 251 and 232 of the insert 10.

When the upper surface 30a of the shim 30 faces the upper surface 10a of the insert 10, for example, the first to third inclined support portions 321, 331 and 351 of the shim 30 may be configured to be contact with the first to third inclined mounting portions 171, 131 and 151 of the insert 10, respectively. As another example, the first to third inclined support portions 321, 331 and 351 of the shim 30 may be configured to be contact with the fourth to sixth inclined mounting portions 181, 132 and 152 of the insert 10, respectively.

When the upper surface 30a of the shim 30 faces the lower surface 10b of the insert 10, for example, the first to third inclined support portions 321, 331 and 351 of the shim 30 may be configured to be contact with the seventh to ninth inclined mounting portions 191, 231 and 251 of the insert 10, respectively. As another example, the first to third inclined support portions 321, 331 and 351 of the shim 30 may be configured to be contact with the tenth to twelfth inclined mounting portions 201, 232 and 252 of the insert 10, respectively.

Referring to FIG. 9, the first inclined support portion 321 may be disposed on the left side of the thickness direction centerline $M_3$, and the second and third inclined support portions 331 and 351 may be disposed on the right side of the thickness direction centerline $M_3$. That is, the first inclined support portion 321 and the second and third inclined support portions 331 and 351 may be disposed on the opposite sides with respect to the thickness direction centerline $M_3$. Accordingly, the shim 30 may support the insert 10 at three points spaced apart from each other by a predetermined distance or more. This makes it possible to firmly support the insert 10.

According to one embodiment, the shim middle portion 36 may include a concave portion 361 disposed between the second and third inclined support portions 331 and 351 and formed to be concave in the Z-axis direction. The concave portion 361 may have a shape depressed in the Z-axis direction so that, even if the shim 30 be contact with the insert 10, the concave portion 361 does not interfere with the first and second insert middle portions 16 and 26. Furthermore, the concave portion 361 of the shim 30 may be configured not to be contact with the first to fourth inclined mounting portions 171, 181, 191 and 201 of the insert 10.

Figure 10:
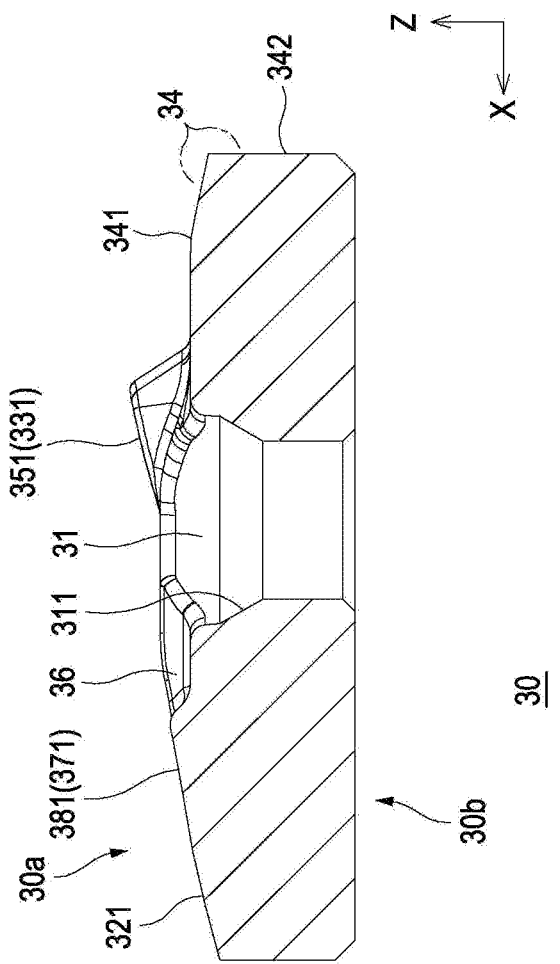
FIG. 10 is a sectional view of the shim shown in FIG. 9, which is taken along line IV-IV.

FIG. 10 is a sectional view of the shim 30 shown in FIG. 9, which is taken along line IV-IV.

Referring to FIG. 10, the second and third inclined support portions 331 and 351 of the upper surface 30a may be disposed on a plane extending from the first inclined support portion 321. In addition, the inclined portion 341 may be inclined in a direction opposite to the first inclined support portion 321. Moreover, the third corner portion 34 may have an end surface 342 formed so as to be perpendicular to the lower surface 30b.

The inner circumferential surface 311 surrounding a part of the opening 31 formed in the shim middle portion 36 may inclined so that the radius thereof decreases downward. The inner circumferential surface 311 may support the head of the second screw 40 shown in FIG. 2. Therefore, in a process of coupling the second screw 40 to the holder 50, the second screw 40 may be contact with the inner circumferential surface 311 of the shim 30 and may fix the shim 30 to the holder 50.

Figure 11:
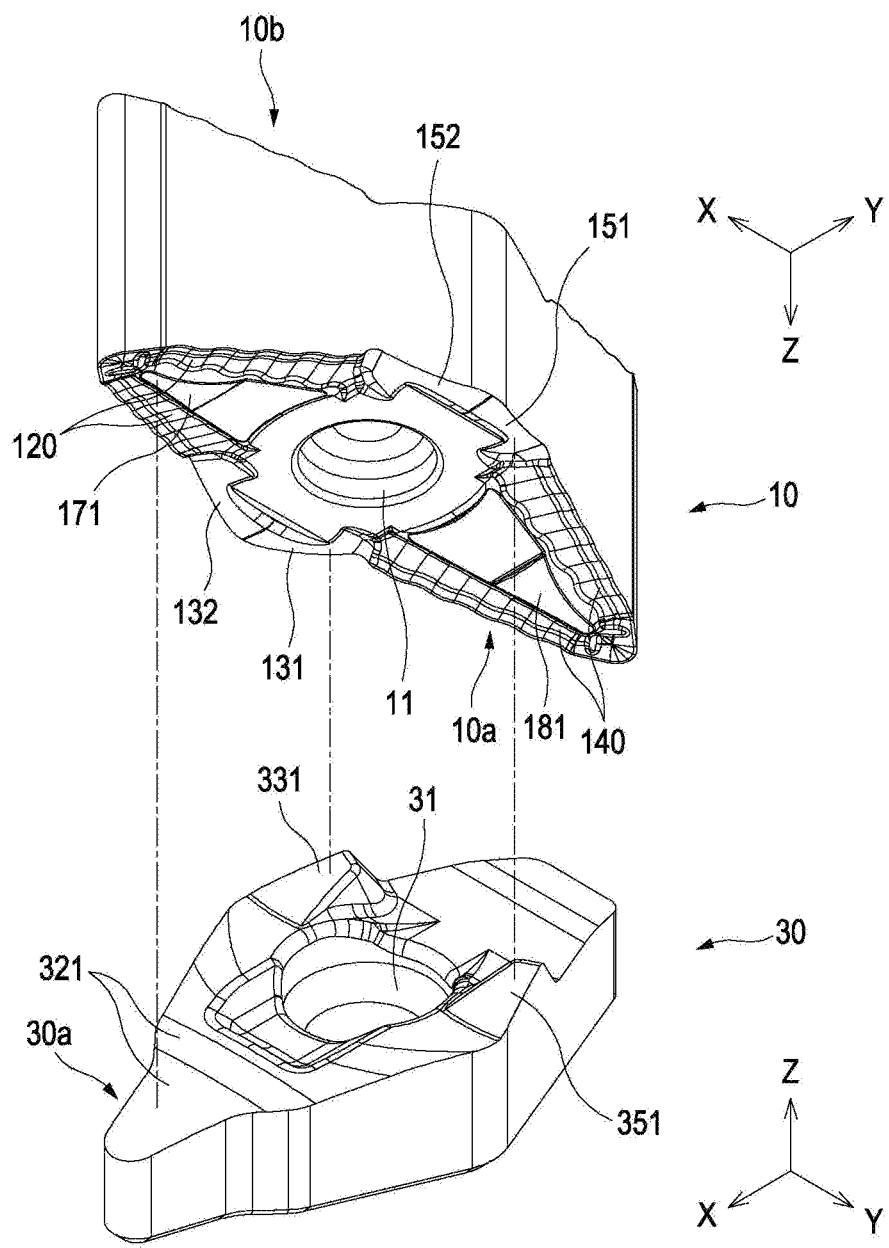
FIG. 11 is an exploded perspective view showing an exploded state of the insert and the shim according to one embodiment of the present disclosure.
Figure 12:
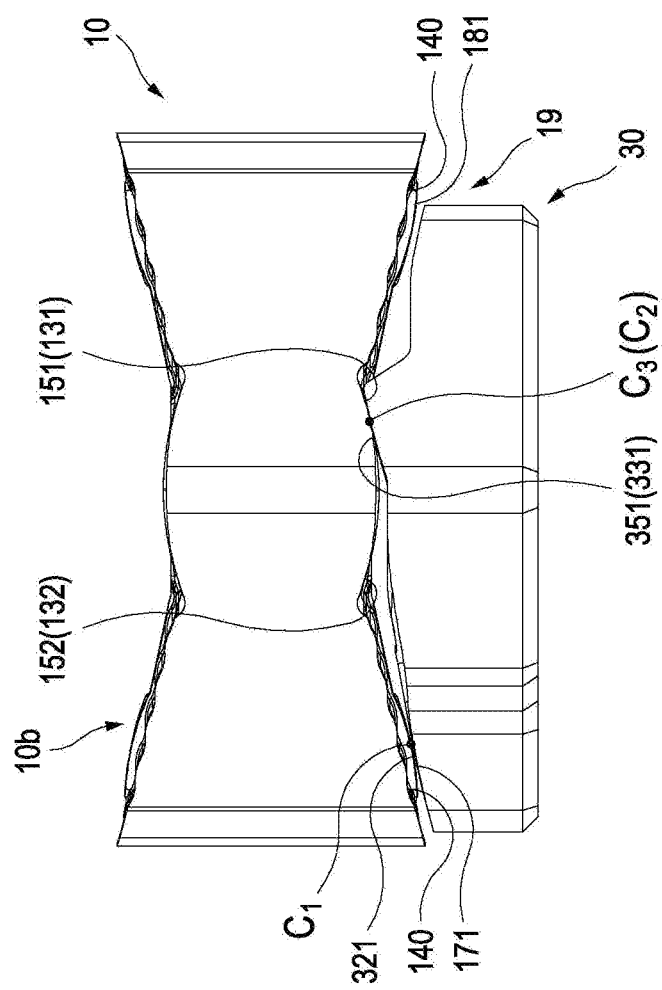
FIG. 12 is a side view showing the insert and the shim shown in FIG. 11, which are assembled together.

FIG. 11 is an exploded perspective view showing an exploded state of the insert 10 and the shim 30 according to one embodiment of the present disclosure. FIG. 12 is a side view showing the insert 10 and the shim 30 shown in FIG. 11, which are assembled together.

The opening 11 of the insert 10 may be coaxially aligned with the opening 31 of the shim 30 about the Z axis. In one embodiment, the upper surface 10a of the insert 10 may be disposed to face the upper surface 30a of the shim 30. In another embodiment, the lower surface 10b of the insert 10 may be disposed to face the upper surface 30a of the shim 30.

Referring to FIG. 11, the first inclined mounting portion 171 of the insert 10 may be brought into contact with and supported by the first inclined support portion 321 of the shim 30. The second inclined mounting portion 131 of the insert 10 may be brought into contact with and supported by the second inclined support portion 331 of the shim 30. The third inclined mounting portion 151 of the insert 10 may be brought into contact with and supported by the third inclined support portion 351 of the shim 30.

In another example, the insert 10 may be rotated 180 degrees about the Z axis from the state shown in FIG. 11. In this case, the fourth inclined mounting portion 181 of the insert 10 may be brought into contact with and supported by the first inclined support portion 321 of the shim 30. The fifth inclined mounting portion 132 of the insert 10 may be brought into contact with and supported by the third inclined support portion 351 of the shim 30. The sixth inclined mounting portion 152 of the insert 10 may be brought into contact with and supported by the second inclined support portion 351 of the shim 30.

Referring to FIG. 12, the first contact point $C_1$ of the first inclined mounting portion 171 may be brought into point-to-point contact with and supported by the first inclined support portion 321. The second contact point $C_2$ of the second inclined mounting portion 131 may be brought into point-to-point contact with and supported by the second inclined support portion 331. The third contact point $C_3$ of the third inclined mounting portion 151 may be brought into point-to-point contact with and supported by the third inclined support portion 351.

According to the embodiments described above, the three inclined mounting portions of the insert 10 are supported by the three inclined support portions of the shim 30. Therefore, the insert 10 is firmly supported by the shim 30, whereby the cutting quality can be improved in the cutting process.

Figure 13:
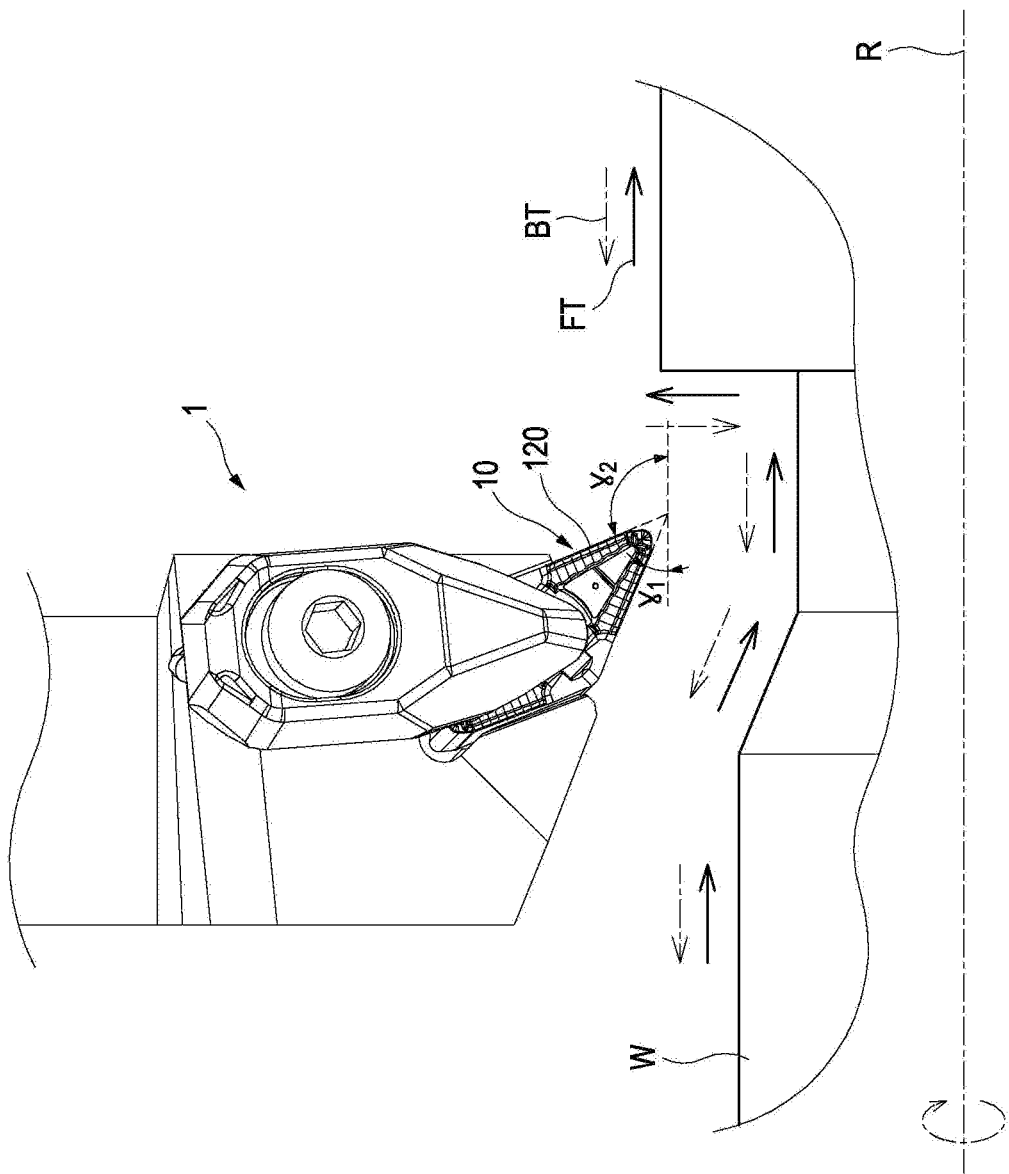
FIG. 13 is a view showing a process of cutting a workpiece with the cutting tool assembly according to one embodiment of the present disclosure, which is illustrated in a direction in which the upper surface of the insert is visible.

FIG. 13 is a view showing a process of cutting the workpiece W with the cutting tool assembly 1 according to one embodiment of the present disclosure, which is illustrated in a direction in which the upper surface 10a of the insert 10 is visible.

Referring to FIG. 13, the first cutting portion 120 of the insert 10 may be contact with the workpiece W to cut the workpiece W. The work W may be rotated about a rotation axis R. The process in which the insert 10 moves to the right (as indicated by solid line arrows) with respect to the workpiece W may be defined as a forward turning (FT) process. The process in which the insert 10 moves to the left (as indicated by one-dot chain line arrows) with respect to the workpiece W may be defined as a backward turning (BT) process.

In the backward turning process, the work surface of the workpiece W and the first cutting portion 120 of the insert 10 may form a predetermined angle $\gamma_1$. The predetermined angle $\gamma_1$ may be, for example, an angle between 20 degrees and 25 degrees. For example, the predetermined angle $\gamma_1$ may be 22.5 degrees. In the forward turning process, the work surface of the workpiece W and the first cutting portion 120 of the insert 10 may form a predetermined angle $\gamma_2$. The predetermined angle $\gamma_2$ may be, for example, an angle between 110 degrees and 120 degrees. For example, the predetermined angle $\gamma_2$ may be 112.5 degrees.

Referring to FIG. 2, the insert 10 according to the embodiment of the present disclosure has a configuration including the cutting portion inclined toward the insert middle portion and the inclined mounting portion. Therefore, when the insert 10 is mounted on the holder 50 and is subjected to the forward turning (FT) process or the backward turning (BT) process, it is possible to induce the generation of soft chips having a radius shape and the smooth discharge of chips. Accordingly, it is possible to protect the outer surface of the cut workpiece W from the chips without causing damage thereto. Furthermore, even when the workpiece W is machined in the backward turning (BT) process in which the workpiece W and the insert 10 form a predetermined angle $\gamma_1$, it is possible to obtain a constant chip thickness and to induce the generation of soft chips having a radius shape and the smooth discharge of chips even in a high-speed feeding machining process.

Figure 14:
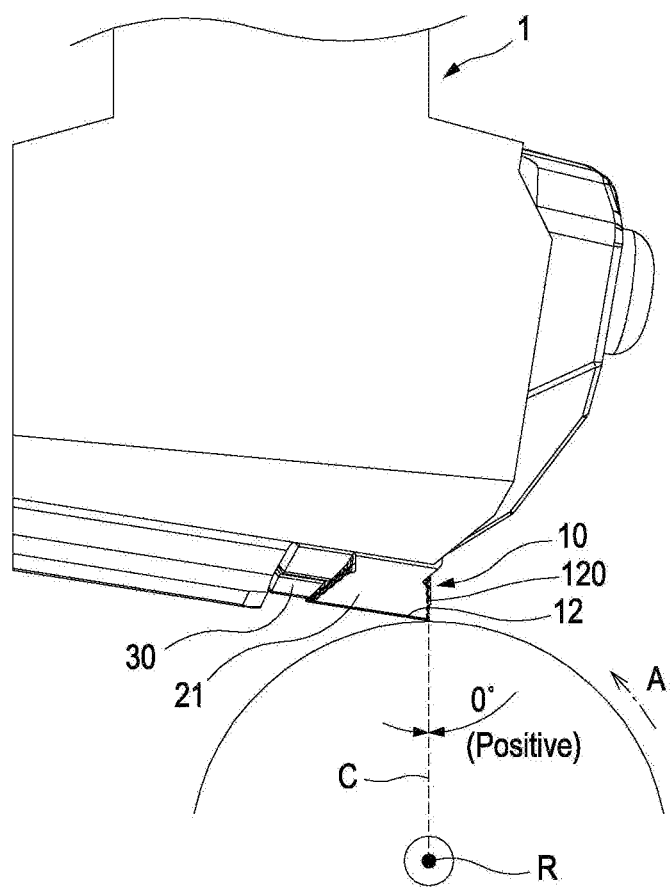
FIG. 14 is a view showing a process of cutting a workpiece with the cutting tool assembly according to one embodiment of the present disclosure, which is illustrated in a direction in which the side surface of the insert is visible.

FIG. 14 is a view showing a process of cutting the workpiece with the cutting tool assembly 1 according to one embodiment of the present disclosure, which is illustrated in a direction in which the side surface 21 of the insert 10 is visible.

The insert 10 may be supported by the shim 30. Referring to FIG. 13, the workpiece W may rotate in a counterclockwise direction A about the rotation axis R. The first cutting portion 120 of the insert 10 is formed to be inclined toward the insert middle portion. Thus, the angle between the centerline C of the workpiece W extending from the rotation axis R and the first cutting portion 120 may be substantially 0 degree. In this process, the insert 10 may form a positive rake angle with respect to the workpiece W. When the insert 10 forms the positive rake angle with the workpiece W, the space formed between the workpiece W and the first cutting portion 120 is sufficient. Therefore, chips having constant thickness and size may be generated in the cutting process.

Figure 15:
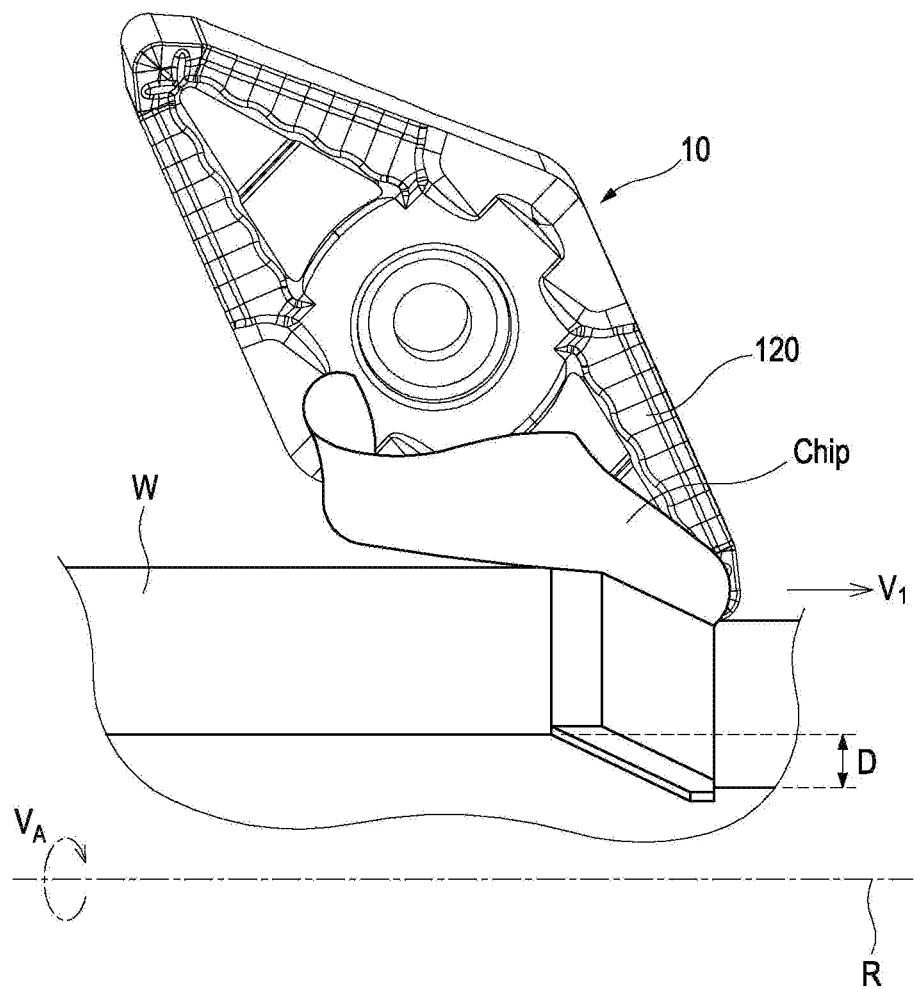
FIG. 15 is a view showing a chip generated in a process of cutting a workpiece with the insert according to one embodiment of the present disclosure.

FIG. 15 is a view showing the chip generated in the process of cutting the workpiece W with the insert 10 according to one embodiment of the present disclosure.

The material of the insert 10 may be, for example, SCM440. The rotational velocity $V_A$ of the workpiece W may be 250 m/min. In addition, the feed distance $V_1$ per revolution of the workpiece W may be 0.4 mm/rev. Moreover, the cutting depth D of the outer diameter portion of the workpiece W may be 1.5 mm. The outer diameter portion of the workpiece W may be cut by the first cutting portion 120 of the insert 10.

Figure 16:
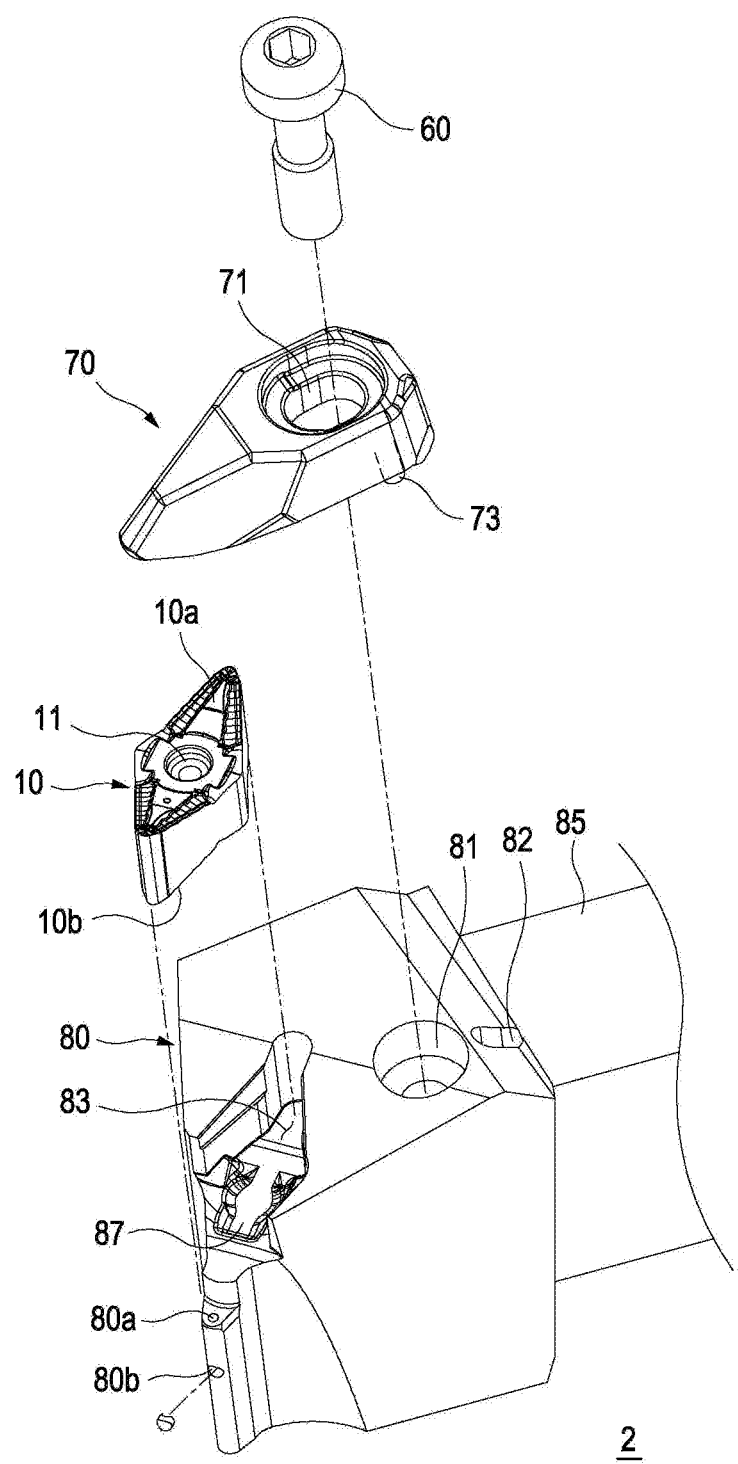
FIG. 16 is an exploded perspective view showing an exploded state of a cutting tool assembly according to another embodiment of the present disclosure.

FIG. 16 is an exploded perspective view showing an exploded state of a cutting tool assembly 2 according to another embodiment of the present disclosure.

A description on the configuration overlapping with the configuration described in the above embodiment is omitted. Unlike the above-described embodiment, the cutting tool assembly 2 does not adopt the shim 30 and the second screw 40 shown in FIG. 2.

The cutting tool assembly 2 may include an insert 10, a clamp 70, a holder 80 and a first screw 60. For example, the upper surface 10a of the insert 10 may be supported by the clamp 70. Alternatively, when the insert 10 is turned upside down, the lower surface 10b may be supported by the clamp 70. In addition, a cutting machine (not shown) may hold the main body 85 of the holder 80.

The clamp 70 may be a 'T-shaped' clamp with an opening 71 formed therein. The holder 80 may be provided with a screw receiving portion 81 for making coupling with the first screw 60. The clamp 70 may be coupled to the holder 80 by the first screw 60. That is, the first screw 60 may penetrate the opening 71 of the clamp 70 and may fix the clamp 70 to the holder 80. In this process, the clamp 70 may be configured to press the insert 10 toward the holder 80.

In one embodiment, the holder 80 may be provided with a receiving portion 83 for receiving the insert 10. The receiving portion 83 may have a shape corresponding to the shape of the insert 10. The bottom surface 87 of the receiving portion 83 may be configured to support the upper surface 10a or the lower surface 10b of the insert 10. For example, the bottom surface 87 may have a shape complementary to the shape of the upper surface 10a or the lower surface 10b of the insert 10.

In one embodiment, the bottom surface 87 may have the same shape as the upper surface 30a of the shim 30 shown in FIG. 9. Therefore, the configuration of the shim 30 shown in FIG. 9 may be reflected in the holder 80. That is, the bottom surface 87 may have a shape integrated with the upper surface 30a of the shim 30. In the present embodiment, the shim 30 and the second screw 40 shown in FIG. 2 are not required and, therefore, the total number of parts is reduced. It is therefore possible to reduce the manufacturing cost.

In the cutting tool assemblies according to various embodiments of the present disclosure, the cutting portion of the insert is formed to be inclined toward the center portion. Thus, the cutting portion of the insert can form a positive rake angle with the cut surface of the workpiece. Therefore, the chips formed at the time of cutting can be induced to have a constant thickness and shape. In addition, the insert of the present disclosure can minimize the fusion to the workpiece W and the cutting resistance, thereby improving the machined surface roughness, the tool lifespan and chip processing capability.

The technical idea of the present disclosure has been described heretofore with reference to some embodiments and examples shown in the accompanying drawings. However, it is to be understood that various substitutions, modifications and alterations may be made without departing from the technical idea and scope of the present disclosure that can be understood by those of ordinary skill in the technical field to which the present disclosure pertains. Further, it is to be understood that such substitutions, modifications and alterations fall within the appended claims.

The invention claimed is:

1. A cutting tool assembly for cutting a workpiece, comprising:
a reversible, double-sided insert for use in a cutting tool assembly for cutting a workpiece, insert comprising:
upper and lower surfaces, each having a quadrilateral shape and identical to one another;
first and second side surfaces connecting the upper and lower surfaces;
a thickness direction centerline passing through the upper and lower surfaces, the insert having 180° rotational symmetry about the thickness direction centerline,
a longitudinal centerline perpendicular to the thickness direction centerline and passing in-between the upper and lower surfaces, the insert having 180° rotational symmetry about the longitudinal centerline,
first, second, third and fourth insert corner portions formed at respective corners of the upper surface, the first and third insert corner portions being diagonally opposite one another and the second and fourth corner portions being diagonally opposite one another;
a first cutting portion extending from first insert corner portion towards the second and fourth insert corner portions, the first cutting portion having a first cutting edge extending in a direction of the second insert corner portion and a second cutting edge extending in a direction of the fourth insert corner portion;
a second cutting portion extending from the third insert corner portion towards the second and fourth insert corner portions, the second cutting portion having a third cutting edge extending in a direction of the second insert corner portion and a fourth edge extending in a direction of the fourth insert corner portion;
an insert middle portion disposed between the first, second, third and fourth insert corner portions, the insert middle portion having a thickness measured along the thickness direction centerline;
a first inclined mounting portion formed between the first insert corner portion and the insert middle portion, wherein:
a vertical thickness of the insert along the first inclined mounting portion decreases from the first insert corner portion in a direction of the thickness direction centerline;
a second inclined mounting portion formed proximate the second insert corner portion and located closer to the third insert corner portion than to the first insert corner portion, wherein in a second side view of the insert:
a vertical thicknesses of the insert along the second inclined mounting portion increases in a direction of the thickness direction centerline; and
a third inclined mounting portion formed proximate the fourth insert corner portion and located closer to the third insert corner portion than to the first insert corner portion, wherein in a first side view of the insert:
a vertical thicknesses of the insert along the third inclined mounting portion increases in a direction of the thickness direction centerline, and
a shim configured to support the insert, the shim including a shim first inclined support portion configured to support the insert's first inclined mounting portion, a shim second inclined support portion formed to extend from the shim first inclined support portion to one side and configured to support the insert's second inclined mounting portion, and a shim third inclined support portion formed to extend from the shim first inclined support portion to the other side and configured to support the insert's third inclined mounting portion.

2. The cutting tool assembly of claim 1, wherein:
the shim has an upper surface that has a quadrilateral shape so as to include first, second, third and fourth shim corner portions,
the shim second inclined support portion is formed in the second shim corner portion, and
the shim third inclined support portion is formed in the fourth shim corner portion.

3. The cutting tool assembly of claim 2, wherein:
the shim includes a shim middle portion disposed between the first, second third and fourth shim corner portions and having a thickness direction centerline arranged in a direction perpendicular to the quadrilateral shape of the upper surface of the shim so as to pass through a shim center, and
the shim first inclined support portion is disposed on one side of the thickness direction centerline, and the shim second and third inclined support portions are disposed on the other side of the thickness direction centerline.

4. The cutting tool assembly of claim 3, wherein the shim middle portion includes a concave portion formed between the shim second inclined support portion and the shim third inclined support portion so as to be concave toward the shim thickness direction centerline.

5. A reversible, double-sided insert for use in a cutting tool assembly for cutting a workpiece, the insert comprising:
upper and lower surfaces, each having a quadrilateral shape and identical to one another;
first and second side surfaces connecting the upper and lower surfaces;
a thickness direction centerline passing through the upper and lower surfaces, the insert having 180° rotational symmetry about the thickness direction centerline;
a longitudinal centerline perpendicular to the thickness direction centerline and passing in-between the upper and lower surfaces, the insert having 180° rotational symmetry about the longitudinal centerline;
a transverse midplane passing through an intersection of the thickness direction centerline and the longitudinal centerline orthogonal to the longitudinal centerline;
first, second, third and fourth insert corner portions formed at respective corners of the upper surface, the first and third insert corner portions being diagonally opposite one another and the second and fourth corner portions being diagonally opposite one another;
a first cutting portion extending from first insert corner portion towards the second and fourth insert corner portions, the first cutting portion having a first cutting edge extending in a direction of the second insert corner portion and a second cutting edge extending in a direction of the fourth insert corner portion;
a second cutting portion extending from the third insert corner portion towards the second and fourth insert corner portions, the second cutting portion having a third cutting edge extending in a direction of the second insert corner portion and a fourth edge extending in a direction of the fourth insert corner portion;
an insert middle portion disposed between the first, second, third and fourth insert corner portions, the insert middle portion having a vertical thickness measured along the thickness direction centerline;

a first inclined mounting portion formed between the first insert corner portion and the insert middle portion, wherein:
- a vertical thickness measured along the thickness direction centerline of the insert along the first inclined mounting portion decreases in a first direction from the first insert corner portion towards the transverse midplane;

a second inclined mounting portion starting at and extending from the transverse midplane towards the third insert corner portion, the second inclined mounting portion adjacent to or in the second insert corner portion and located closer to the third insert corner portion than to the first insert corner portion, wherein:
- a vertical thickness measured along the thickness direction centerline of the insert along the second inclined mounting portion increases in a second direction from the third insert corner portion towards the transverse midplane; and a third inclined mounting portion starting at and extending from the transverse midplane towards the third insert corner portion, the third inclined mounting portion adjacent to or in the fourth insert corner portion and located closer to the third insert corner portion than to the first insert corner portion, wherein:
- a vertical thickness measured along the thickness direction centerline of the insert along the third inclined mounting portion increases in the second direction.

6. The insert of claim 5, further comprising:

a fourth inclined mounting portion formed between the third insert corner portion and the insert middle portion, wherein:
- a vertical thickness measured along the thickness direction centerline of the insert along the third inclined mounting portion decreases in the second direction;

a fifth inclined mounting portion starting at and extending from the transverse midplane towards the first insert corner portion, the fifth inclined mounting portion adjacent to or in the second insert corner portion and located closer to the first insert corner portion than to the third insert corner portion, wherein:
- a vertical thickness measured along the thickness direction centerline of the insert along the fifth inclined mounting portion increases in the first direction; and a sixth inclined mounting portion starting at and extending from the transverse midplane towards the third insert corner portion, the sixth inclined mounting portion adjacent to or in the fourth insert corner portion and located closer to the first insert corner portion than to the third insert corner portion, wherein:
- a vertical thickness measured along the thickness direction centerline of the insert along the sixth inclined mounting portion increases in the first direction.

7. The insert of claim 6, wherein:

the second and fifth inclined mounting portions are inclined in opposite directions along the thickness direction centerline, and the third and sixth inclined mounting portions are inclined in opposite directions along the thickness direction centerline.

8. The insert of claim 5, wherein along each cutting edge, the first and second cutting portions comprise a plurality of alternating convex and concave surfaces.

9. The insert of claim 5, wherein in a top view of the upper surface, the first cutting edge and the second cutting edge form an angle between 40 degrees and 50 degrees.

10. The insert of claim 5, wherein in a side view the insert, the first and fourth inclined mounting portions each form an angle between 10 degrees and 15 degrees with the longitudinal centerline.

* * * * *